(12) United States Patent
Coign et al.

(10) Patent No.: US 9,011,079 B2
(45) Date of Patent: Apr. 21, 2015

(54) TURBINE NOZZLE COMPARTMENTALIZED COOLING SYSTEM

(75) Inventors: Robert Walter Coign, Piedmont, SC (US); Gregory Thomas Foster, Greer, SC (US); Ravichandran Meenakshisundaram, Greenville, SC (US); Glen Arthur MacMillan, Simpsonville, SC (US); Aaron Gregory Winn, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 13/345,781

(22) Filed: Jan. 9, 2012

(65) Prior Publication Data
US 2013/0177384 A1 Jul. 11, 2013

(51) Int. Cl.
 *F01D 9/02* (2006.01)
 *F01D 5/18* (2006.01)
 *F01D 25/12* (2006.01)
(52) U.S. Cl.
 CPC .......... *F01D 5/188* (2013.01); *F05D 2260/201* (2013.01); *Y02T 50/676* (2013.01)
(58) Field of Classification Search
 CPC ........... F01D 5/188; F01D 5/189; F01D 9/02; F01D 9/023; F01D 9/06; F01D 9/065; F01D 11/005; F01D 25/12; F05D 2240/128; F05D 2260/201
 USPC ................ 415/115, 116, 139, 175, 177, 202; 416/96 R, 96 A, 224, 232
 See application file for complete search history.

(56) References Cited

U.S. PATENT DOCUMENTS

| | | | |
|---|---|---|---|
| 4,187,054 A | 2/1980 | Landis, Jr. et al. | |
| 5,120,192 A * | 6/1992 | Ohtomo et al. | 415/115 |
| 5,197,852 A | 3/1993 | Walker et al. | |
| 5,320,483 A * | 6/1994 | Cunha et al. | 415/114 |
| 5,609,466 A | 3/1997 | North et al. | |
| 6,142,730 A * | 11/2000 | Tomita et al. | 415/115 |
| 6,217,279 B1 * | 4/2001 | Ai et al. | 415/110 |
| 6,227,798 B1 | 5/2001 | Demers et al. | |
| 6,382,906 B1 | 5/2002 | Brassfield et al. | |
| 6,383,602 B1 | 5/2002 | Fric et al. | |
| 6,386,825 B1 | 5/2002 | Burdgick | |
| 6,418,618 B1 | 7/2002 | Burdgick | |
| 6,530,744 B2 * | 3/2003 | Liotta et al. | 415/115 |
| 6,761,529 B2 | 7/2004 | Soechting et al. | |
| 6,769,865 B2 | 8/2004 | Kress et al. | |
| 6,843,479 B2 * | 1/2005 | Burdgick | 277/312 |
| 6,932,568 B2 | 8/2005 | Powis et al. | |
| 6,984,101 B2 | 1/2006 | Schiavo, Jr. | |
| 7,008,185 B2 * | 3/2006 | Peterman et al. | 416/96 A |
| 7,029,228 B2 | 4/2006 | Chan et al. | |
| 7,252,481 B2 | 8/2007 | Stone | |
| RE40,658 E | 3/2009 | Powis et al. | |
| 7,918,024 B2 * | 4/2011 | Mooney et al. | 29/889.21 |

(Continued)

*Primary Examiner* — Dwayne J White
*Assistant Examiner* — Alexander White
(74) *Attorney, Agent, or Firm* — Sutherland Asbill & Brennan LLP

(57) ABSTRACT

The present application provides a compartmentalized cooling system for providing a cooling flow in a turbine with a flow of combustion gases therein. The compartmentalized cooling system may include a turbine nozzle and a cooling baffle. The turbine nozzle may include an airfoil insert and a nozzle outer sidewall. The cooling baffle may include a high pressure cooling passage in communication with the airfoil insert in a first circuit and an impingement plate positioned about the nozzle outer sidewall in a second circuit.

20 Claims, 3 Drawing Sheets

(56) References Cited

U.S. PATENT DOCUMENTS

| | | |
|---|---|---|
| 2002/0028134 A1 | 3/2002 | Burdgick |
| 2002/0182057 A1 | 12/2002 | Liotta et al. |
| 2002/0187040 A1 | 12/2002 | Predmore |
| 2005/0244267 A1 | 11/2005 | Coign et al. |
| 2006/0053798 A1 | 3/2006 | Hadder |
| 2006/0062673 A1 | 3/2006 | Coign et al. |
| 2006/0073011 A1 | 4/2006 | Lee et al. |
| 2007/0237624 A1 | 10/2007 | Nigmatulin |
| 2008/0089780 A1 | 4/2008 | Erickson et al. |
| 2008/0152488 A1 | 6/2008 | Kammel et al. |
| 2010/0011773 A1 | 1/2010 | Suleiman et al. |
| 2010/0068041 A1 | 3/2010 | Nigmatulin et al. |
| 2010/0278631 A1 | 11/2010 | Heda et al. |
| 2010/0281879 A1* | 11/2010 | Shapiro et al. .................. 60/782 |
| 2010/0284800 A1 | 11/2010 | Sewall et al. |
| 2011/0014045 A1 | 1/2011 | McCall |
| 2011/0014054 A1 | 1/2011 | Nagler et al. |
| 2011/0044803 A1 | 2/2011 | DiPaola et al. |

* cited by examiner

TURBINE NOZZLE COMPARTMENTALIZED COOLING SYSTEM

TECHNICAL FIELD

The present application and the resultant patent relate generally to gas turbine engines and more particularly relate to a turbine nozzle compartmentalized cooling system for a split case turbine design so as to provide high pressure cooling air with low leakage.

BACKGROUND OF THE INVENTION

Generally described, a turbine stage of a gas turbine engine includes a number of stationary turbine nozzles. Each turbine nozzle may have a vane extending radially between outer and inner sidewalls. The nozzle vanes may have an airfoil configuration for guiding the combustion gases between corresponding turbine rotor blades disposed upstream and downstream thereof. The turbine rotor blades may be mounted to the perimeter of a rotor disk for rotation therewith. Because the turbine nozzle vanes are heated during operation by the hot combustion gases that flow therethrough, cooling air bled from the compressor may be channeled inside the vanes for cooling purposes. Limiting the amount of parasitic cooling air required and limiting the leakage of such cooling air lost in the nozzle vanes and elsewhere should promote overall gas turbine engine efficiency and performance.

Compartmentalized cooling has been used in the past with aviation turbine engines and the like. Such aviation engines generally include a circular (360°) component to direct the cooling flow into the nozzles. This configuration may be possible with aviation engines given that aviation engines generally are full hoop case structures that are axially stacked during assembly. Due to the overall size of industrial gas turbine engines, however, such industrial gas turbines generally are installed in at least two half (180°) segments, if not many more. This segmented configuration generally precludes the use of a 360° component to route the cooling flow into the nozzle arrangement.

There is thus a desire for an improved industrial gas turbine design. Such an improved industrial gas turbine design may use a number of segmented cooling baffles to provide high pressure cooling air with low leakage so as to promote efficient cooling with low leakage.

SUMMARY OF THE INVENTION

The present application and the resultant patent thus provide a compartmentalized cooling system for providing a cooling flow in a turbine with a flow of combustion gases therein. The compartmentalized cooling system may include a turbine nozzle and a cooling baffle. The turbine nozzle may include an airfoil insert and a nozzle outer sidewall. The cooling baffle may include a high pressure cooling passage in communication with the airfoil insert in a first circuit and an impingement plate positioned about the nozzle outer sidewall in a second circuit. The cooling baffle thus provides a high pressure cooling flow with low leakage.

The present application and the resultant patent further provide a method of cooling a nozzle of a turbine. The method may include the steps of delivering a first circuit cooling flow under high pressure to an airfoil insert of a nozzle vane through a cooling baffle, cooling the nozzle vane with the first circuit cooling flow, delivering a second circuit cooling flow to an impingement plate of the cooling baffle positioned about a nozzle outer sidewall, and cooling the outer nozzle sidewall with the second circuit cooling flow.

The present application and the resultant patent further provide a compartmentalized cooling system for providing a cooling flow in a turbine with a flow of combustion gases therein. The compartmentalized cooling system may include a turbine nozzle and a number of cooling baffle segments. The turbine nozzle may include an airfoil insert and a nozzle outer sidewall. Each of the cooling baffle segments may include a high pressure cooling passage in communication with the airfoil insert in a first circuit and an impingement plate positioned about the nozzle outer sidewall in a second circuit.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
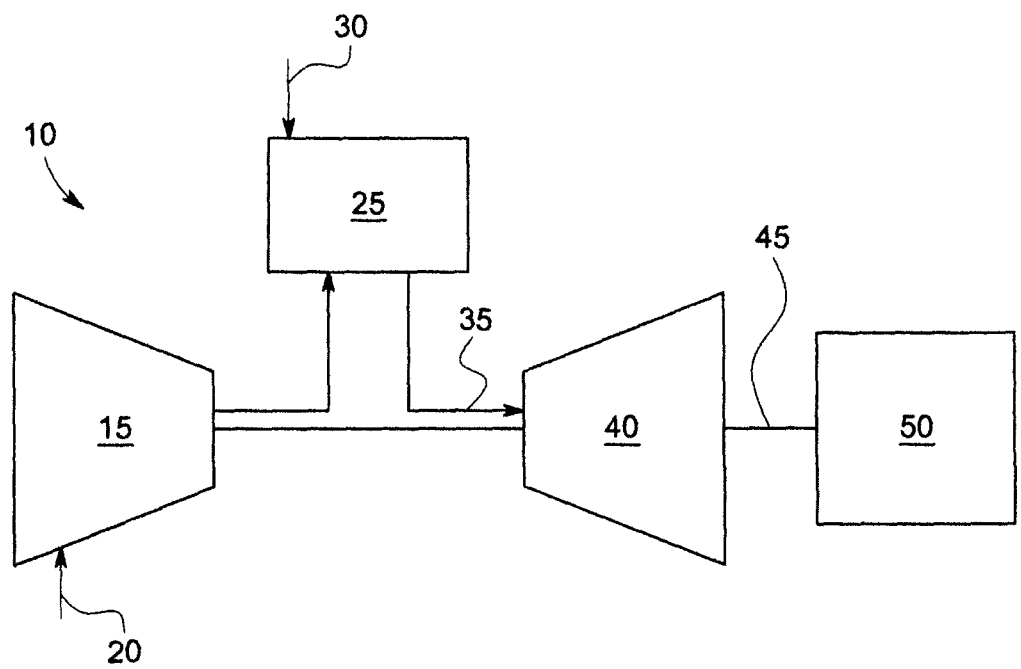
FIG. 1 is a schematic view of a gas turbine engine including a compressor, a combustor, and a turbine.
Figure 2:
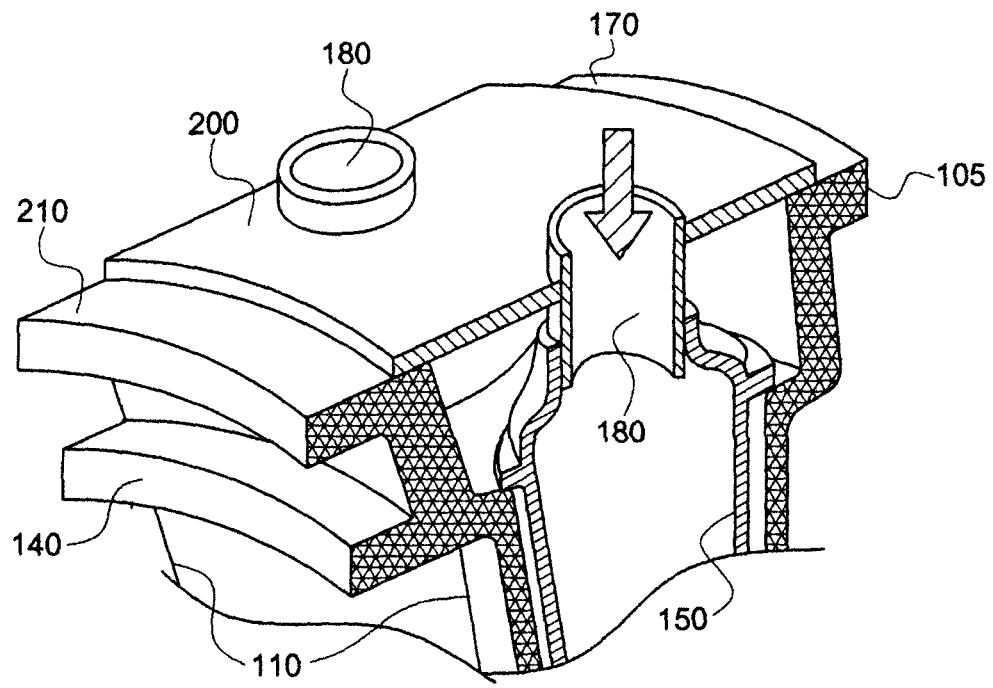
FIG. 2 is a partial perspective side cross-sectional view of a coolant baffle as may be described herein positioned about a nozzle vane.
Figure 3:
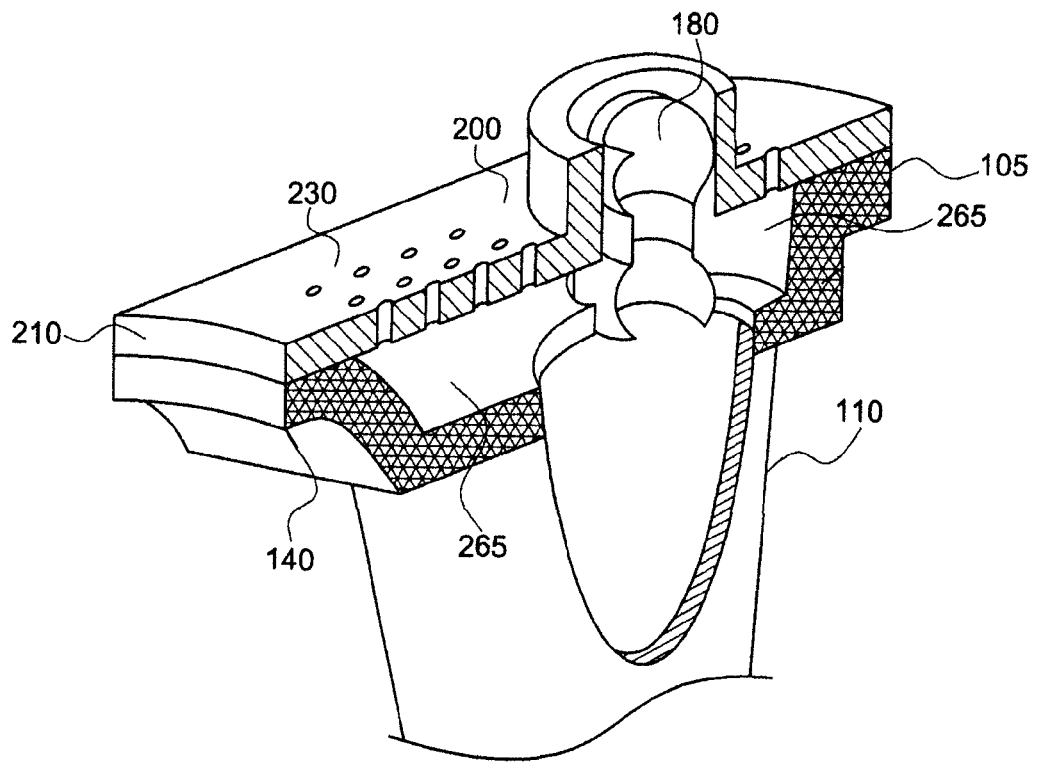
FIG. 3 is a partial perspective side cross-sectional view of the cooling baffle and the nozzle vane of FIG. 2.
Figure 4:
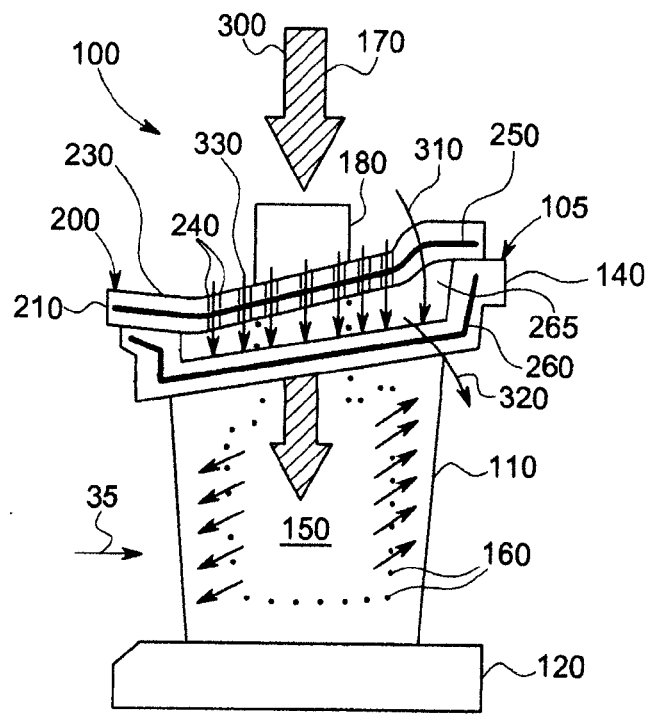
FIG. 4 is a partial side view of the cooling baffle and the nozzle vane of FIG. 2 showing the airflow circuits therethrough.
Figure 5:
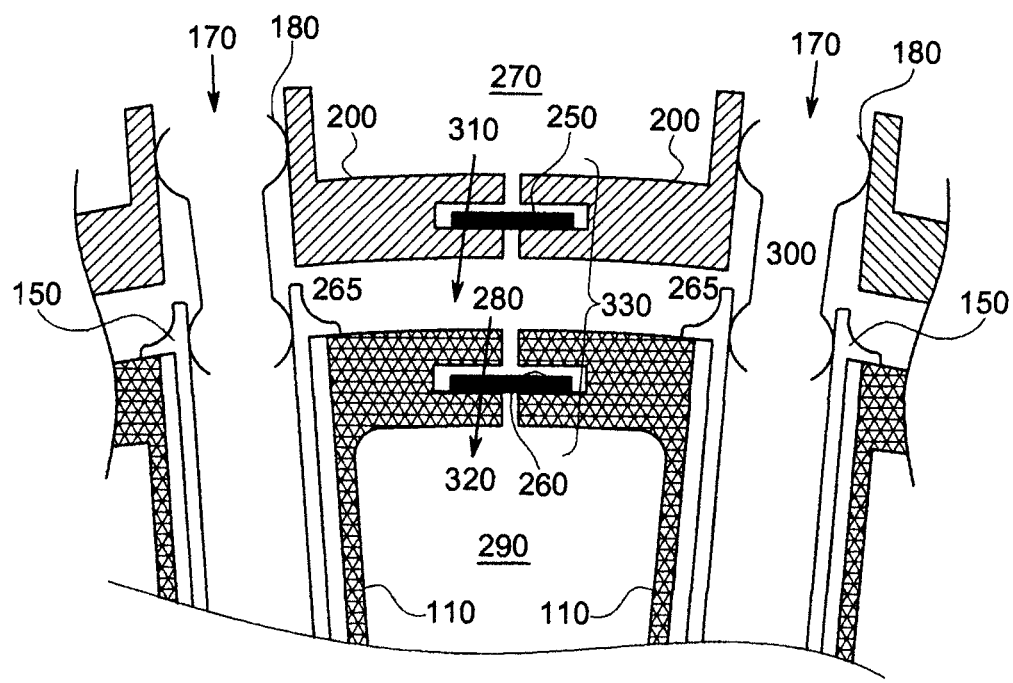
FIG. 5 is a partial side cross-sectional view of portions of two cooling baffles and nozzle vane segments of FIG. 2 and the intersegment gaps therebetween and showing the airflow circuits therethrough.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

FIGS. 2-5 show portions of a turbine nozzle compartmentalized cooling system 100 as may be described herein. The turbine nozzle compartmentalized cooling system 100 may be used with a number of turbine nozzles 105 of the turbine 40 described above and the like. The turbine nozzles 105 may be part of a split case design. Each of the turbine nozzles 105 may include a nozzle vane 110. The nozzle vane 110 may extend between an inner sidewall 120 and an outer sidewall 140 in a cantilevered fashion. A number of the turbine nozzles 105 may be combined into a circumferential array to form a stage with a number of rotor blades (not shown).

The nozzle 105 may include the nozzle outer sidewall 140 extending about the nozzle vane 110. The nozzle vane 110 may be substantially hollow. An airfoil insert 150 may be positioned within the nozzle vane 110. The airfoil insert 150 may have a number of cooling apertures 160 formed therein. The cooling apertures 160 may be used to direct a cooling flow 170 about the nozzle vane 110 via impingement cooling and the like. The airfoil insert 150 may be in communication with the cooling flow 170 from the compressor 15 via a tube seal or other type of high pressure cooling passage 180 as part of a cooling circuit. More than one cooling passage 180 may be used herein. Other components and other configurations may be used herein.

The turbine nozzle compartmentalized cooling system 100 also may include a cooling baffle 200 positioned about the turbine nozzle 105. The cooling baffle 200 may be positioned between the cooling supply from the compressor 15 and the outer sidewall 140 of the turbine nozzle 105. The cooling baffle 200 may be in the form of a number of segments 210. Specifically, the cooling baffle 200 may be segmented into at least two (2) segments 210 and up to one (1) segment 210 per nozzle vane 110 in a given stage. The gaps between each of the cooling baffle segments 210 may be sealed with a spline seal and the like.

The cooling baffle 200 may serve as an impingement plate 230. The impingement plate 230 may have a number of cooling apertures 240 formed therein. Any number or configuration of cooling apertures 240 may be used herein. A first sealing layer 250 may be positioned about the impingement plate 230. A second sealing layer 260 may be positioned about the outer sidewall 140. The sealing layers 250, 260 may be made out of any robust, heat resistant material. The impingement plate 230 and the sealing layers 250, 260 may surround the high pressure cooling passage 180 in communication with the airfoil insert 150. A post-impingement pressure cavity 265 may be defined between the impingement plate 230 and the first sealing layer 250 at one end and the outer sidewall 140 and the second sealing layer 260 at the other end.

In use, the cooling flow 170 from the compressor 15 may pass through a high pressure area 270 above the cooling baffle 200 and the first sealing layer 250, a medium pressure area 280 in the post-impingement pressure cavity 265 between the sealing layers 250, 260, and a low pressure area 290 beneath the post-impingement pressure cavity 265 and the second sealing layer 260 about the flow of combustion gases. As the cooling flow 170 approaches the turbine nozzle 105, the cooling flow 170 has three (3) possible flow paths. First, the cooling flow 170 may directly enter into the airfoil insert 150 within the nozzle vane 110 for cooling therein via the cooling passage 180 under high pressure. Second, the cooling flow 170 may pass through the impingement plate 230 of the coolant baffle 200 and impingement cool the nozzle outer sidewall 140. Third, the cooling flow 170 may leak across the first sealing layer 250 into the post impingement pressure cavity 265. The medium pressure post-impingement air then may leak across the second sealing layer 260 into the low pressure flow of the combustion gases 35. Other configurations and other components also may be used herein.

By routing the cooling flow 170 directly into the airfoil insert 150 via the high pressure cooling passage 180 in a first circuit 300, the cooling flow 170 from the high pressure area 270 may be used for cooling in the nozzle insert 150 without a significant pressure drop. By using the sealing layers 250, 260 in series in a second circuit 330, a first leakage path 310 driven by the high pressure area 270 may extend across the baffle 200 and the first sealing layer 250 while a second leakage path 320 extends across the second sealing layer 260 towards the flow of combustion gases 35 under low pressure. In other words, the cooling flow 170 in the second leakage path 320 extends from the medium pressure area 280 across the second sealing layer 260 and into the low pressure area 290 of the flow of combustion gases 35. As such, the pressure difference between the post impingement pressure cavity 265 and the flow of combustion gases 35 is less than the pressure difference between the cooling flow 170 and the high pressure area 270 and the flow of combustion gases 35. Any leakage from the nozzle outer sidewall 140 thus may be driven by the pressure of the post impingement pressure cavity 265 instead of the compressor extraction from the high pressure area 270. As a result, the sealing layers 250 and 260 in conjunction with the cooling baffle 200 of the turbine nozzle compartmentalized cooling system 100 may provide lower leakage while using the air from the high pressure area 270 for cooling without a significant pressure drop.

The cooling baffle 200 of the turbine nozzle compartmentalized cooling system 100 may be a separate element or cast into place. Specifically, hollow bridge like structures may be cast into the nozzle outer sidewall 140 while machining cooling apertures therethrough such that the seal layers 250, 260 could be placed therein. An impingement plate could be attached to the top of the bridges or sidewalls. Alternatively, a fully enclosed plenum also could be cast to the nozzle outer sidewalls 140 and then drilled with impingement holes and the like with the seal layers 250, 260 and the like therein.

The turbine nozzle 105 with the cooling baffle 200 thus enables compartmentalized cooling in a split case turbine design. Such compartmentalized cooling reduces leakage while providing high pressure cooling air to multiple cooling circuits without an appreciable pressure drop. Lower leakage and higher pressure cooling air should provide increased efficiency, increased performance, and longer component lifetime with limited costs and materials.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A compartmentalized cooling system for providing a cooling flow in a turbine with a flow of combustion gases therein, comprising:
   a turbine nozzle;
   the turbine nozzle comprising an airfoil insert and a nozzle outer sidewall; and
   a cooling baffle;
   the cooling baffle comprising a high pressure cooling passage in communication with the airfoil insert in a first circuit and an impingement plate positioned about the nozzle outer sidewall in a second circuit;
   wherein a post-impingement pressure cavity is defined radially between the impingement plate and the nozzle outer sidewall; and wherein the cooling baffle further comprises a first sealing layer positioned along the impingement plate and radially outward of the post-impingement pressure cavity.

2. The compartmentalized cooling system of claim 1, wherein the cooling baffle comprises a plurality of cooling baffle segments.

3. The compartmentalized cooling system of claim 2, wherein the first sealing layer is positioned between a pair of the plurality of cooling baffle segments.

4. The compartmentalized cooling system of claim 1, wherein the airfoil insert receives a first portion of the cooling flow via the high pressure cooling passage, and wherein the post-impingement pressure cavity receives a second portion of the cooling flow via the impingement plate.

5. The compartmentalized cooling system of claim 4, wherein the impingement plate is positioned radially between the post-impingement pressure cavity and a cooling supply cavity, and wherein the cooling supply cavity comprises an area of high pressure.

6. The compartmentalized cooling system of claim 1, wherein the post-impingement pressure cavity comprises an area of intermediate pressure.

7. The compartmentalized cooling system of claim 6, wherein the post-impingement pressure cavity surrounds the high pressure cooling passage.

8. The compartmentalized cooling system of claim 6, wherein the nozzle outer sidewall is positioned radially between the post-impingement pressure cavity and a combustion gas flow path of the turbine, and wherein the combustion gas flow path comprises an area of low pressure.

9. The compartmentalized cooling system of claim 1, wherein the nozzle further comprises a second sealing layer positioned along the nozzle outer sidewall and radially inward of the post-impingement pressure cavity.

10. The compartmentalized cooling system of claim 9, wherein a first leakage path is defined across the first sealing layer and a second leakage path is defined across the second sealing layer.

11. The compartmentalized cooling system of claim 1, wherein the airfoil insert comprises a plurality of cooling apertures.

12. The compartmentalized cooling system of claim 1, wherein the cooling flow is in communication with a compressor.

13. The compartmentalized cooling system of claim 1, wherein the turbine nozzle further comprises a nozzle vane extending from a nozzle inner sidewall to the nozzle outer sidewall, and wherein the airfoil insert is positioned within the nozzle vane.

14. The compartmentalized cooling system of claim 1, wherein the high pressure cooling passage comprises a tube seal.

15. A method of cooling a nozzle of a turbine, comprising:
delivering a first circuit cooling flow under high pressure to an airfoil insert of a nozzle vane through a cooling baffle;
cooling the nozzle vane with the first circuit cooling flow;
delivering a second circuit cooling flow to a post-impingement pressure cavity defined radially between an impingement plate of the cooling baffle and a nozzle outer side wall of the nozzle;
sealing the post-impingement pressure cavity with a first sealing layer positioned along the impingement plate and radially outward of the post-impingement pressure cavity; and
cooling the outer nozzle side wall with the second circuit cooling flow.

16. A compartmentalized cooling system for providing a cooling flow in a turbine with a flow of combustion gases therein, comprising:
a turbine nozzle;
the turbine nozzle comprising an airfoil insert and a nozzle outer sidewall; and
a plurality of cooling baffle segments;
each of the plurality of cooling baffle segments comprising a high pressure cooling passage in communication with the airfoil insert in a first circuit and an impingement plate positioned about the nozzle outer sidewall in a second circuit;
wherein a post-impingement pressure cavity is defined radially between the impingement plates and the nozzle outer sidewall; and
wherein each of the plurality of cooling baffle segments further comprises a first sealing layer positioned along the impingement plate and radially outward of the post-impingement pressure cavity.

17. The compartmentalized cooling system of claim 16, wherein the first sealing layer is positioned between a pair of the plurality of cooling baffle segments.

18. The compartmentalized cooling system of claim 16, wherein the airfoil insert receives a first portion of the cooling flow via the high pressure cooling passages, and wherein the post-impingement pressure cavity receives a second portion of the cooling flow via the impingement plates.

19. The compartmentalized cooling system of claim 16, wherein the nozzle further comprises a second sealing layer positioned along the nozzle outer sidewall and radially inward of the post-impingement pressure cavity.

20. The compartmentalized cooling system of claim 19, wherein a first leakage path is defined across the first sealing layer and a second leakage path is defined across the second sealing layer.

* * * * *